Figure 1:
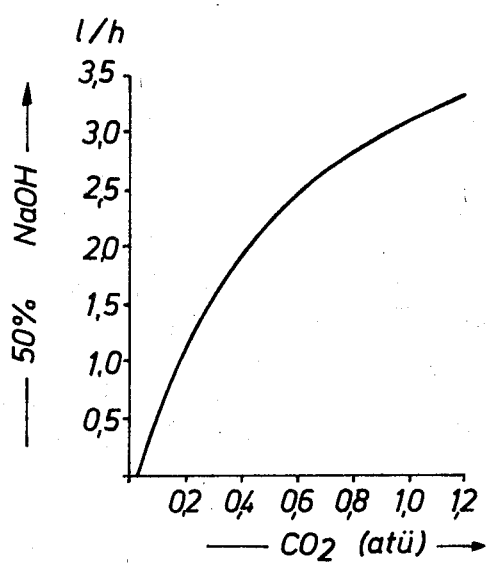

United States Patent

Minz et al.

[15] 3,644,089

[45] Feb. 22, 1972

[54] PREPARATION OF SODIUM CARBONATE

[72] Inventors: Franz-Rudolf Minz, Dormagen; Eberhard Zirngiebl, Cologne-Flittard, both of Germany

[73] Assignee: Farbenfabriken Bayer Aktiengesellschaft, Leverkusen, Germany

[22] Filed: Nov. 25, 1969

[21] Appl. No.: 879,667

[30] Foreign Application Priority Data

Nov. 27, 1968 Germany .......................P 18 11 168.7

[52] U.S. Cl. ..............................................................23/63
[51] Int. Cl. ..........................................................C01d 7/00
[58] Field of Search ..................................23/63, 64, 65, 302

[56] References Cited

UNITED STATES PATENTS

| 2,787,521 | 4/1957 | Roberts et al. | 23/65 |
| 3,061,409 | 10/1962 | Robson et al. | 23/63 |
| 3,103,413 | 9/1963 | Blumenthal | 23/63 |
| 3,179,579 | 4/1965 | Heinemann et al. | 204/128 X |
| 3,202,477 | 8/1965 | Loeffleur et al. | 23/63 |

*Primary Examiner*—Oscar R. Vertiz
*Assistant Examiner*—G. O. Peters
*Attorney*—Burgess, Dinklage & Sprung

[57] ABSTRACT

Preparation of sodium carbonate monohydrate by reacting caustic soda solution of a concentration of 10 to 70 percent and carbon dioxide in the presence of solid sodium carbonate at temperatures of 80° to 115° C. the caustic soda solution and the carbon dioxide are continuously reacted in an aqueous sodium-carbonate-containing slurry at a pH-value of 11.3 to 11.5. By driving off the water fed in together with the caustic soda solution and by withdrawing a portion of the slurry, from which the sodium carbonate monohydrate formed in the reaction is recovered a sodium carbonate solid concentration of about 100 to 600 g./l. is maintained in the slurry.

6 Claims, 2 Drawing Figures

PATENTED FEB 22 1972          3,644,089

INVENTORS:
FRANZ RUDOLF MINZ, EBERHARD ZIRNGIEBEL.
BY: Burgers, Dinklag
& Sprung
Attorneys

PREPARATION OF SODIUM CARBONATE

The present invention relates to a process for the preparation of sodium carbonate by reacting carbon dioxide with caustic soda solution in a continuous process.

The demand for chlorine which has considerably increased in the past years is substantially met by electrolysis of rock salt. However, the demand for caustic soda solution which is simultaneously formed in this process has not been increased to the same extent; therefore, the preparation of sodium carbonate from caustic soda solution and carbon dioxide is highly desirable to dispose of the excess quantities of NaOH.

The prior art processes for reacting carbon dioxide or carbon-dioxide-containing gases with caustic soda solution of different concentration, which are obtained, e.g., in diaphragm plants or in the mercury process, suffer from certain processing disadvantages and drawbacks in connection with the apparatus required for carrying out the process, which can be reduced only partially by additional apparatus. The use of towers involves the danger of the packing material becoming clogged; if the towers are run without the use of packing material the absorption effect is substantially diminished; when directly using caustic soda solution (50 percent) the precipitating crystals occlude caustic soda solution and the product is obtained as fine particles which are difficult to filter. The resulting suspension of soda crystals must be concentrated in most cases via hydrocyclones which have a poor output. When using a spiral apparatus for reaction of caustic soda solution and $CO_2$ the product is contaminated by metallic fines from the spiral vanes.

In accordance with the present invention it has now been found that sodium carbonate monohydrate can be obtained in a simple and improved process by reacting caustic soda solution and carbon dioxide in the presence of solid sodium carbonate, which comprises continuously reacting caustic soda solution of a concentration of 10–70 percent by weight and carbon dioxide in the presence of a supersaturated sodium carbonate monohydrate slurry at temperatures of about 80° to 115° C. with vigorous stirring in such a manner that a pH-value of about 11.3 to 11.5 is maintained in the slurry, a sodium monohydrate solids concentration of about 100 to 600 g./l. being maintained in the slurry by driving off the water introduced together with the caustic soda solution and continuously withdrawing a portion of the slurry from which the sodium carbonate monohydrate is recovered.

The present invention surprisingly prepares sodium carbonate monohydrate in a simple and convenient manner without the drawbacks associated with the prior processes. By the concurrent introduction of carbon dioxide and caustic soda solution in stoichiometric quantities and crystallizing the resulting sodium carbonate from the supersaturated solution the occlusion of impurities, occurring when carbon dioxide directly introduced into concentrated or dilute caustic soda solution, is avoided. Besides, the process of the invention provides good crystal growth so that the product is obtained as large-sized crystals of high purity, which can easily be filtered.

The specific features of the process of the invention are as follows:

Caustic soda solution is added to an aqueous slurry, to which carbon dioxide was previously supplied in a quantity of, e.g., 30 m.³/h., in controlled quantities so that the pH-value of the solution does not deviate substantially from pH 11.3 to 11.5 corresponding to a content of free NaOH of 5 to 10 g./l. The suspension of the resulting crystals is drawn off from the reaction vessel and separated from the mother liquor in a continuously operating separator, preferably a centrifuge; the mother liquor is recycled to the reaction vessel. By varying the quantity of the recycled mother liquor while adding dioxide and caustic soda solution in constant quantities the solid content of the suspension is brought to an optimum value (for the centrifuge) ranging from 100 to 600 g./l., preferably 200 to 400 g./l.; thus, a prethickening apparatus is not required. The carbon dioxide can be introduced as pure $CO_2$ as well as in the form of flue gas containing about 15 percent $CO_2$. The concentration of the caustic soda solution can as well range within wide limits, e.g., 10 to 70 percent by weight.

The water formed in the reaction $2NaOH+CO_2 \rightarrow Na_2CO_3 + H_2O$ is discharged from the system together with the carbonate as water, while the water of crystallization introduced with the caustic soda solution is driven off from the reaction vessel.

Thus, the liquid volume in the entire recycle stream is kept constant. The water which is fed in together with the caustic soda solution can be driven off either by heat supply (evaporation), by blowing in excess carbon dioxide and/or an inert gas or by a combination of both measures.

The herein described process can be carried out at atmospheric pressure as well as at superatmospheric pressure, that means, at elevated $CO_2$ partial pressures.

Figure 2:
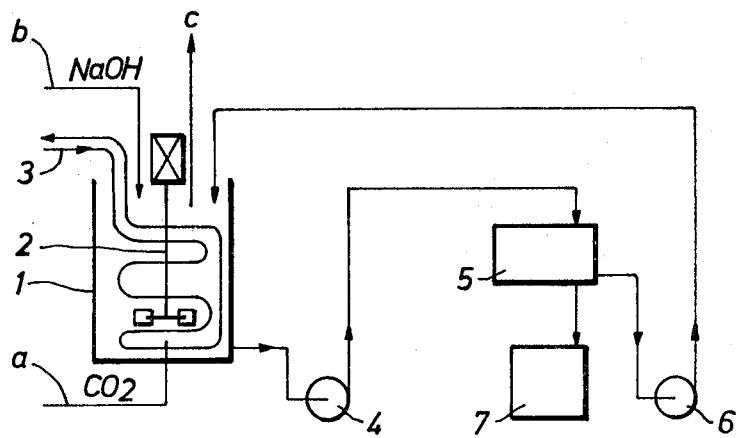

The process of the invention is now illustrated by the accompanying drawing wherein:

FIG. 1 is a flowsheet showing the influence of elevated $CO_2$ partial pressures; and FIG. 2 is a flowsheet showing a preferred embodiment of the process of the invention.

Referring more particularly to the drawing, in FIG. 1 the abscissa indicates the $CO_2$ pressure in atmospheres gauge and the ordinate refers to the quantity of the reacted caustic soda solution (50 percent) in liters per hour.

FIG. 1 shows that the reaction velocity can be substantially increased at $CO_2$ pressures up to 1 atmospheres gauge, whereas a further increase of the reaction velocity can no longer be expected at substantially higher pressures than 2 atmospheres gauge.

The data given in FIG. 1 were determined as follows: 1 liter of saturated soda solution and 1 liter of NaOH (50 percent) were introduced into a 2.5-liter tube. Carbon dioxide (99.5 percent) was then passed into the solution. By throttling the degasification valve appropriate pressures were adjusted in the autoclave and the duration of the reaction up to the quantitative conversion of the previously supplied NaOH was determined.

The process of the invention is carried out in a high-speed stirrer vessel. A stirrer which allows the introduction of carbon dioxide in finely divided form into the suspension, e.g., a gas distributing stirrer according to Zlorkarnik (Chem. Eng. Techn. 39 (1967), pages 1163–1168) is preferred.

As shown in FIG. 2, a saturated soda solution and an aqueous caustic soda solution are introduced into a cylindrical vessel 1 which is provided with a gas distributing stirrer 2. $CO_2$ is then passed in via line *a* and caustic soda solution is fed in via line *b* in such a manner that the content of free NaOH in the reaction solution does not exceed about 10 g./l. The water introduced together with the caustic soda solution is removed via line *c*. Especially when using dilute gases the evaporation of the water can be promoted by blowing in further quantities of gas. By circulating part of the reaction solution via pumps 4 and 6 and interposed centrifuge 5 the sodium carbonate concentration in the reaction vessel is maintained at the desired level.

The crystals separated from the suspension, which are obtained in the form of sodium carbonate monohydrate with a residual moisture content of 1.5 to 5 percent, are conveyed to a drier 7 wherein the crystals are freed of the residual moisture only or of their entire water content by varying the temperature; in the first instance, pure monohydrate is obtained, while in the second instance, anhydrous light soda results.

The process of the invention is now further described in the following examples without being restricted thereto:

EXAMPLE 1

Three hundred and fifty liters of a saturated soda solution is introduced into a 500-liter container which is equipped with a gas distributing stirrer (as to the calculation of the container capacity and the dimensions of the stirrer see Zlokarnik, cited above) and the soda solution is heated to about 60° C. Twenty-five standard m.³/h. of carbon dioxide (99 percent) and 1 l./h. of NaOH (50 percent) are continuously introduced into the solution so that the content of free NaOH in the reaction solution amounts to 5 to 10 g./l. By the heat of reaction evolved the temperature of the reaction solution rises to 90° to 95° C. Further heat supply is controlled in such a manner that the liquid volume remains constant by evaporation of excess water. When the reaction solution has reached a solids content of about 200 g./l. by precipitation of soda crystals, part of the slurry is pumped to a preheated continuously discharging centrifuge which separates the reaction solution from the carbonate in the form of sodium carbonate monohydrate. The solution separated from the solid product is returned by pumping to the reaction vessel. The pH-value of the system is measured in the solution separated from the solid product and kept at 11.3 to 11.5. The solid product with a surface moisture of 1 to 3 percent and a water of crystallization content of 14.5 percent is freed of adhering water by subsequently drying at 90° C.—the residence time depends on the surface moisture and is about 5–10 minutes.

EXAMPLE 2

In manner similar to Example 1, a gas mixture consisting of 15 percent of $CO_2$ and 85 percent of air is passed into a sodium hydroxide solution previously placed in a 20-liter vessel which is equipped with a gas distributing stirrer. Part of the water introduced together with the NaOH is thereby driven off by the escaping inert gases; the remainder is evaporated by heat.

The further course of the reaction corresponds to the experiment of Example 1, except that drying is effected at 150° C. so that anhydrous sodium carbonate results.

It will be appreciated that the instant specification and examples are set forth by way of illustration and not limitation, and that various modifications and changes may be made without departing from the spirit and scope of the present invention.

What is claimed is:

1. In a process for preparing sodium carbonate monohydrate by reacting caustic soda solution and carbon dioxide in the presence of solid sodium carbonate, the improvement which comprises continuously reacting caustic soda solution of a concentration of 10 to 70 percent by weight and carbon dioxide in the presence of a supersaturated sodium carbonate monohydrate slurry at temperatures of about 80° to 115° C. with vigorous stirring in such a manner that a pH-value of about 11.3 to 11.5 is maintained in the slurry, a sodium carbonate monohydrate solids concentration of about 100 to 600 g./l. being maintained in the slurry by driving off the water introduced together with the caustic soda solution and continuously separating sodium carbonate monohydrate from the slurry.

2. Process according to claim 1, wherein the water introduced with the caustic soda solution is evaporated by heat.

3. Process according to claim 1, wherein the water introduced with the caustic soda solution is removed by excess $CO_2$, an inert gas or mixtures thereof.

4. Process according to claim 3, wherein a portion of the introduced water is removed through evaporation by heat.

5. Process according to claim 1, wherein the reaction is carried out at elevated $CO_2$ partial pressures of up to 2 atmospheres.

6. Process according to claim 1, wherein the sodium carbonate monohydrate solids concentration in the slurry amounts to 200 to 400 g./l.

* * * * *